(12) United States Patent
Seewig

(10) Patent No.: US 8,973,280 B2
(45) Date of Patent: Mar. 10, 2015

(54) METHOD FOR DETERMINING A TWIST STRUCTURE

(75) Inventor: Jörg Seewig, Kaiserslautern (DE)

(73) Assignee: HOMMEL-ETAMIC GmbH, Villingen-Schwenningen (DE)

( * ) Notice: Subject to any disclaimer, the term of this patent is extended or adjusted under 35 U.S.C. 154(b) by 957 days.

(21) Appl. No.: 13/096,375

(22) Filed: Apr. 28, 2011

(65) Prior Publication Data

US 2011/0283784 A1   Nov. 24, 2011

(30) Foreign Application Priority Data

Apr. 29, 2010   (DE) .......................... 10 2010 018 820

(51) Int. Cl.
*G01B 5/20* (2006.01)
*G01L 25/00* (2006.01)
*G01B 5/28* (2006.01)
*G01B 21/30* (2006.01)

(52) U.S. Cl.
CPC . *G01B 5/28* (2013.01); *G01B 21/30* (2013.01)
USPC ............................................ 33/551; 702/105

(58) Field of Classification Search
CPC .......... G01B 21/30; G01B 7/28; G01B 5/201; G01B 5/28
USPC .................... 33/551; 702/81, 84, 105; 73/105
See application file for complete search history.

(56) References Cited

U.S. PATENT DOCUMENTS

| | | | |
|---|---|---|---|
| 4,986,004 A | 1/1991 | Hartmann et al. | |
| 5,095,634 A | 3/1992 | Overlach et al. | |
| 6,067,720 A | 5/2000 | Heilbronner et al. | |
| 6,327,788 B1 * | 12/2001 | Seddon et al. | 33/551 |
| 6,490,912 B1 | 12/2002 | Volk | |

FOREIGN PATENT DOCUMENTS

| | | |
|---|---|---|
| DE | 1 673 865 | 9/1971 |
| DE | 43 15 745 A1 | 11/1994 |
| DE | 197 40 141 C1 | 4/1999 |
| DE | 198 17 406 C 1 | 2/2000 |
| DE | 10 2006 001 799 B4 | 7/2007 |
| DE | 10 2006 001 799 B4 | 10/2007 |
| EP | 2 383 541 B1 | 4/2011 |
| EP | 2 383 541 A1 | 11/2011 |
| WO | WO 2007082669 A2 | 7/2007 |

OTHER PUBLICATIONS

"Mercedes-Benz-Werksnorm MBN 31 007-7" Copyright Daimler 2008 (14 pages).
"J. Seewig, T. Hercke: 2nd Generation Twist Measurement, XIX IMECO World Congress Fundamental and Applied Metrology, 2009, 1957-1961, ISBN 978-963-88410-01, Lisbon, Portugal," (5 pages).
European Search Report in counterpart application No. EP 2 383 541 A1 dated Jul. 13, 2011 (3 pages).
U.S. Appl. No. 12/805,053, filed Jul. 2010, Wegmann.
U.S. Appl. No. 12/923,412, filed Sep. 2010, Arnold.
U.S. Appl. No. 13/041,196, filed Mar. 2011, Keller.
U.S. Appl. No. 13/214,764, filed Aug. 2011, Volk.
U.S. Appl. No. 13/073,625, filed Mar. 2011, Arnold.
U.S. Appl. No. 12/662,813, filed May 2010, Keller.
Opposition Against EPO Patent No. EP 2 383 541, European counterpart of U.S. Appl. No. 13/096,375, Opposition dated Jun. 26, 2013, (44 pages).
International Standard ISO 4288, "Geometrical Product Specifications (GPS)—Surface Texture: Profile Method—Rules and Procedures for the Assessment of Surface Texture," 2nd Edition, dated Aug. 1, 1996 (8 pages).
Opposition in German Patent and Trademark Office against German Patent Application No. DE 10 2010 018 820 B3, German Priority Application for U.S. Appl. No. 13/096,375, filed Apr. 28, 2011, (11 pages).

\* cited by examiner

*Primary Examiner* — Hezron E Williams
*Assistant Examiner* — David Z Huang
(74) *Attorney, Agent, or Firm* — Shlesinger, Arkwright & Garvey LLP

(57) ABSTRACT

Method for determining a twist structure in the surface roughness of a workpiece which is cylindrical at least in part includes that multiple sampling segments which extend in the axial direction of the workpiece and which are mutually spaced apart in the circumferential direction are carried out in a surface region of interest on the workpiece, and the value of at least one parameter of the twist structure is determined based on the measured values obtained using the sampling segments. An estimated value of at least one parameter of the twist structure is determined based on the measured values associated with a first sampling segment, the estimated value being corrected based on the measured values associated with at least one second sampling segment.

7 Claims, No Drawings

METHOD FOR DETERMINING A TWIST STRUCTURE

CROSS-REFERENCE TO RELATED APPLICATIONS

This application claims the priority of German application no. 10 2010 018 820.4, filed Apr. 29, 2010, and which is incorporated herein by reference.

FIELD OF THE INVENTION

The invention relates to a method for determining a twist structure in the surface roughness of a component which is cylindrical at least in part. More particularly, the invention relates to a method for determining a twist structure in the surface roughness of a component which is cylindrical at least in part, and in which multiple sampling segments which extend in the axial direction of the workpiece and which are mutually spaced apart in the circumferential direction are carried out in a surface region of interest on the workpiece.

BACKGROUND OF THE INVENTION

Twist structures may arise in the surface of cylindrical components in particular during machine cutting, for example grinding of the workpiece surface. Twist refers to a directional structure in the circumferential direction, in particular on shafts in a shaft/shaft seal ring system. Depending on its characteristics the twist may result in leaks between shafts and shaft seal rings.

For this reason it is known to determine the twist structure using suitable measuring methods.

A distinction is made between a macro twist and a micro twist, depending on the characteristics of the twist. The macro twist may be formed as a dressing twist, for example, which is an axially periodic, single- to multi-thread structure which circumferentially extends at an angle. However, the macro twist may also be in the form of a periodic or nonperiodic null twist, in which the threads of the twist structure are situated and terminate exactly in the circumferential direction. In addition, the macro twist may be formed as a feed twist, which is a periodic, single-thread structure that circumferentially extends at an angle and has a period length equal to the feed rate. The micro twist may in particular be a setting twist in a micro-grinding structure whose primary structural direction departs from perpendicularity with respect to the workpiece axis.

Within the scope of the invention, a macro twist (also referred to below as "twist" for short) is involved which is periodically pronounced in both the axial and circumferential directions. The periodic characteristic in the circumferential direction has an integer value, and is also referred as the "thread number." A detailed description of the twist measuring technique according to the prior art is found in Mercedes-Benz company standard MBN 31 007-7.

A method is known from DE 197 40 141 C1 for determining a twist structure in the surface roughness of a precision machined solid or hollow cylindrical workpiece, in which multiple axially oriented sampling segments having a high axial measuring point density are carried out on a circumferential strip of interest on the workpiece at a different, although precisely known, circumferential position and with an axial position which in each case is precisely known, whereby the individual local roughness profiles of the various sampling segments according to their axial and circumferential relative position on the workpiece are printed out in close succession to one another corresponding to their position, the representation of the measurement printout being exaggerated or extended in the radial and axial directions and being compressed in the circumferential direction, thus representing a topography which is distorted with respect to the individual dimensions according to differing affinities, but which descriptively illustrates the microstructure of the surface of the circumferential strip as a winding in the oblique view.

A method is known from DE 10 2006 001 799 B4 for twist measurement on workpiece surfaces, in which measured values are obtained by sampling the workpiece surface along a line which has an axial component parallel to the axis and has a circumferential component in the circumferential direction of the axis, the line having at least one first segment and at least one second segment, the segments in the axis having different angles; and based on the measured values, at least one parameter which characterizes the twist structure is determined.

A method of the type in question for determining a twist structure in the surface roughness of a workpiece is known from the citation "J. Seewig, T. Hercke: 2nd Generation Twist Measurement, XIX IMECO World Congress Fundamental and Applied Metrology, 2009, 1957-1961, ISBN 978-963-88410-01, Lisbon, Portugal." The method known from the citation is also referred to as a second-generation twist measuring method. In this method, multiple sampling segments which extend in the axial direction of the workpiece and which are spaced apart relative to each other in the circumferential direction are carried out in a surface region of interest on the workpiece. A first "coarse" measuring grid is composed of 72 sampling segments at the circumference, with an angular increment of 5° and a measuring length of at least 2 mm. This coarse measuring grid makes possible the description of twist structures having a maximal thread number of 15. Higher thread numbers are recorded using a second measuring grid composed of 72 sampling segments having an angular increment of 0.5° and a measuring length which is likewise 2 mm.

The basis of the evaluation is a reconstruction of the dominant twist structure from the measured data set. For this purpose, one function (composed of three additively superimposed, harmonically related cosine functions having eight free parameters) is fitted to the discrete measured data according to least squares regression analysis. With regard to the details of this analytical method, reference is made to the literature citation. The twist structure is characterized by six parameters: the twist depth Dt, the thread number DG, the theoretical conveying cross section DF per revolution DFu, the period length DP, and the percentage support surface DLv. In the known method, the parameter or parameters of the twist structure is/are determined sequentially in three steps: first, a measuring grid is selected and the sampling segment measurement is carried out. The dominant twist structure and the characteristic values are then determined.

OBJECTS AND SUMMARY OF THE INVENTION

It is an object of the invention to overcome the drawbacks of the prior art.

Another object of the invention is to provide a method for determining a twist structure in the surface roughness of a workpiece which is cylindrical at least in part, thus improving the suitability of the workpiece for use in mass production.

This, and other objects, is achieved by the invention set forth herein.

The invention includes an embodiment of the method for determining a twist structure in the surface roughness of a workpiece which is cylindrical at least in part, and in which multiple sampling segments which extend in the axial direction of the workpiece and which are mutually spaced apart in the circumferential direction are carried out in a surface region of interest on the workpiece, and in which the value of at least one parameter of the twist structure is determined based on the measured values obtained using the sampling segments, and in which an estimated value of at least one parameter of the twist structure is determined based on the measured values associated with a first sampling segment, and the estimated value is corrected based on the measured values associated with at least one second sampling segment.

The invention is further directed to a tactile measurement in a sampling segment method. The invention is based on the knowledge that detection of the measured data takes considerable time. A customary feed rate of 0.5 mm/sec and a measuring distance of 2 mm results in the theoretically shortest measuring time of 4 min, 48 sec. On this basis, the invention is based on the concept of modifying the known method in such a way that meaningful results are obtained more quickly. On this basis, the invention is based on the further concept of recognizing twist structures without having to record a complete measured data set composed, for example, of 72 sampling segments. The basic concept of the invention is to fit a "preliminary twist structure" and to compute the "preliminary" values, associated therewith, of the parameters of interest for the twist structure. By taking the measured values of any other sampling segment into account, the estimated values of the parameters approach the actual end result.

The invention thus provides a quick test by means of which twist structures may be rapidly recognized. In this manner the usability of the method according to the invention is greatly improved within the scope of measuring processes in a mass production operation.

The method according to the invention results in an initial conclusion concerning the twist structure in the above-described manner after evaluating the measured values of a first sampling segment. One advantageous further embodiment provides that the estimated value is, or the estimated values are, corrected after each newly recorded sampling segment, respectively. In this embodiment, the accuracy of the results of the method improves with addition of the measured values of each further sampling segment, and ultimately converges to an end result that is based on evaluation of the measured data of all sampling segments.

In this regard, it is advantageous that for determining an end result of the parameter, the correction of the estimated values is repeated until the measured values of all sampling segments have been taken into account. In this manner, on the one hand a statement may be quickly made concerning whether, and to what extent, a twist structure is present. On the other hand, taking the measured values of all sampling segments into account results in high accuracy. Compared to the known method, there is the advantage that the measured values associated with a sampling segment may be evaluated concurrently with carrying out the next sampling segment; in other words, carrying out the measurements on the next sampling segment.

Another further embodiment of the invention provides that estimated values of the twist depth and the period length are determined based on the measured values associated with the first sampling segment.

According to another further embodiment, an estimated value of the thread number of the twist structure is determined after carrying out measurements on the second sampling segment.

The invention is explained in greater detail below with reference to one embodiment. All features described and which are claimed in the patent claims constitute the subject matter of the invention, taken alone or in any combination, independently of their combination in the patent claims and their dependencies, and independently of their description.

DETAILED DESCRIPTION OF THE INVENTION

One embodiment of a method according to the invention for determining a twist structure in the surface roughness of a workpiece which is cylindrical at least in part is implemented as follows:

For determining a twist structure, multiple sampling segments which extend in the axial direction of the workpiece and which are mutually spaced apart in the circumferential direction are initially carried out in a surface region of interest on the workpiece, using a first "coarse" measuring grid composed of 72 sampling segments having an angular increment of 5° at the circumference, and a measuring length of at least 2 mm. This coarse measuring grid makes possible the description of twist structures having a maximum thread number of 15. Higher thread numbers may be recorded using a second measuring grid composed of 72 sampling segments having an angular increment of 0.5° and a measuring length which is likewise 2 mm.

The basis of the evaluation is a reconstruction of the dominant twist structure from the measured data set. For this purpose a function $w((m \cdot \Delta\theta, n \cdot \Delta x, \Theta)$ composed of three additively superimposed, harmonically related cosine functions having eight free parameters $\Theta = [\Theta_1, \ldots, \Theta_8]^T$ is fitted to the discrete measured data $z(m \cdot \Delta\theta, n \cdot \Delta x)$ according to least squares regression analysis:

$$\sum_{m=0}^{71} \sum_{n=0}^{N-1} (z(m \cdot \Delta\theta, n \cdot \Delta x) - w(m \cdot \Delta\theta, n \cdot \Delta x, \Theta))^2 \to \min_{\Theta} \quad (1)$$

The compensating function $w(m \cdot \Delta\theta, n \cdot \Delta x, \Theta)$ is defined by $$w(m \cdot \Delta\theta, n \cdot \Delta x, \Theta) = \sum_{k=1}^{3} A_k \cdot \cos\left(2 \cdot \pi \cdot k \cdot \left(\frac{n \cdot \Delta x}{\lambda} + DG \cdot \frac{m \cdot \Delta\Phi}{360°}\right) + \varphi_k\right)$$

where
- $\Delta x$: Sampling increment in the axial direction, in mm
- $\Delta\Phi$: Sampling increment in the circumferential direction, in degrees and the following parameters have the indicated meanings:
- $\lambda$: Wavelength of the periodic component in the axial direction, in mm
- DG: Integer value of the thread number (dimensionless)
- $A_k$: Amplitude of the cosine function, in μm
- $\phi_k$: Angular offset of the cosine function, in radians Details concerning the analysis and the recording of measured data are known from the citation "J. Seewig, T. Hercke: 2nd Generation Twist Measurement, XIX IMECO World Congress Fundamental and Applied Metrology, 2009, 1957-1961, ISBN 978-963-88410-01, Lisbon, Portugal," and therefore are not discussed further here.

The basis of the method according to the invention is a skillful analysis of the optimization problem according to equation (1) above. According to the citation "J. Seewig, T. Hercke: 2nd Generation Twist Measurement, XIX IMECO World Congress Fundamental and Applied Metrology, 2009, 1957-1961, ISBN 978-963-88410-01, Lisbon, Portugal," the base algorithm is composed of two discrete Fourier transformations which are independently carried out in the axial direction and in the circumferential direction. The transformation is first carried out in the axial direction, and then in the circumferential direction. The discrete Fourier transformation in the circumferential direction is numerically efficient, since only periods having integer values may occur at the circumference.

$$\sum_{n=0}^{N-1} (z(0 \cdot \Delta\theta, n \cdot \Delta x) - w(0 \cdot \Delta\theta, n \cdot \Delta x, \Theta_0))^2 \to \min_{\Theta_0}$$

With the aid of the compensating function $w(0 \cdot \Delta\theta, n \cdot \Delta x, \Theta_0)$, the first estimated values $Dt_0$ for the twist depth and $DP_0$ for the period length are determined. The thread number is still undefined after the first sampling segment, and is set to $DG_0=0$.

Further sampling segments are then recorded according to the twist measuring specification. The previously computed characteristic values are corrected after each newly recorded sampling segment:

$$(Dt,DG,DP)_m=(Dt,DG,DP)_{m-1}+\Delta(Dt,DG,DP)_m,$$
$$m=1,\ldots,71$$

Use is made of the fact that all Fourier transformations previously carried out in the axial direction are retained in memory, and have to be supplemented only by the transformation of the current sampling segment. This likewise results in a numerically efficient algorithm.

An estimation of the thread number is possible for the first time after the second sampling segment is measured. With each correction, the characteristic values approach the actual end result of the standardized twist measurement. The end result is exact after 72 sampling segments and the analysis of the results.

The method according to the invention provides a quick test for determining twist structures. A first assessment of the question of whether, and to what extent, a twist structure is present is made possible by the method according to the invention after evaluation of the measured values associated with the first sampling segment. In this step, values of the twist depth and the period length may be determined. Taking the measured values of each further sampling segment into account increases the accuracy, and an estimated value of the thread number may be obtained for the first time after evaluation of the measured values associated with a second sampling segment.

While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention.

What is claimed is:

1. Method for determining a twist structure in the surface roughness of a workpiece which is cylindrical at least in part, comprising:
   a) measurements of multiple sampling segments which extend in the axial direction of the workpiece and which are mutually spaced apart in the circumferential direction are carried out in a surface region of interest on the workpiece;
   b) the value of at least one parameter of the twist structure is determined based on the measured values obtained using the sampling segments;
   c) an estimated value of at least one parameter of the twist structure is determined based on the measured values associated with a first sampling segment;
   d) the estimated value is corrected based on the measured values associated with at least one second sampling segment;
   e) at least one estimated value is corrected after each newly recorded sampling segment;
   f) for determining an end result of at least one parameter, the correction of the at least one estimated value is repeated until the measured values of each of the multiple sampling segments have been taken into account; and
   g) estimated values of the twist depth and the period length are determined based on the measured values associated with the first sampling segment.

2. Method according to claim 1, wherein:
   a) an estimated value of the thread number of the twist structure is determined after carrying out measurements on the at least one second sampling segment.

3. Method for determining a twist structure in the surface roughness of a workpiece which is cylindrical at least in part, comprising:
   a) measurements of multiple sampling segments which extend in the axial direction of the workpiece and which are mutually spaced apart in the circumferential direction are carried out in a surface region of interest on the workpiece;
   b) the value of at least one parameter of the twist structure is determined based on the measured values obtained using the sampling segments;
   c) an estimated value of at least one parameter of the twist structure is determined based on the measured values associated with a first sampling segment;
   d) the estimated value is corrected based on the measured values associated with at least one second sampling segment;
   e) for determining an end result of at least one parameter, the correction of the at least one estimated value is repeated until the measured values of each of the multiple sampling segments have been taken into account; and
   f) estimated values of the twist depth and the period length are determined based on the measured values associated with the first sampling segment.

4. Method according to claim 3, wherein:
   a) an estimated value of the thread number of the twist structure is determined after carrying out measurements on the at least one second sampling segment.

5. Method for determining a twist structure in the surface roughness of a workpiece which is cylindrical at least in part, comprising:
   a) measurements of multiple sampling segments which extend in the axial direction of the workpiece and which are mutually spaced apart in the circumferential direction are carried out in a surface region of interest on the workpiece;

b) the value of at least one parameter of the twist structure is determined based on the measured values obtained using the sampling segments;

c) an estimated value of at least one parameter of the twist structure is determined based on the measured values associated with a first sampling segment;

d) the estimated value is corrected based on the measured values associated with at least one second sampling segment; and e) estimated values of the twist depth and the period length are determined based on the measured values associated with the first sampling segment.

6. Method according to claim 5, wherein:

a) an estimated value of the thread number of the twist structure is determined after carrying out measurements on the at least one second sampling segment.

7. Method for determining a twist structure in the surface roughness of a workpiece which is cylindrical at least in part, comprising:

a) measurements of multiple sampling segments which extend in the axial direction of the workpiece and which are mutually spaced apart in the circumferential direction are carried out in a surface region of interest on the workpiece;

b) the value of at least one parameter of the twist structure is determined based on the measured values obtained using the sampling segments;

c) an estimated value of at least one parameter of the twist structure is determined based on the measured values associated with a first sampling segment;

d) the estimated value is corrected based on the measured values associated with at least one second sampling segment; and e) an estimated value of the thread number of the twist structure is determined after carrying out measurements on the at least one second sampling segment.

* * * * *